United States Patent [19]
Payne et al.

[11] Patent Number: 5,858,442
[45] Date of Patent: Jan. 12, 1999

[54] PROCESS FOR MAKING EXTENDERS FOR LOWER FAT MEAT SYSTEMS

[75] Inventors: Tony Payne; Russ Egbert, both of Decatur, Ill.

[73] Assignee: Archer Daniels Midland Company, Decatur, Ill.

[21] Appl. No.: 795,995

[22] Filed: Feb. 5, 1997

Related U.S. Application Data

[63] Continuation-in-part of Ser. No. 482,878, Jun. 7, 1995, Pat. No. 5,626,899.

[51] Int. Cl.$^6$ .................................. A23L 1/52; A23J 3/14
[52] U.S. Cl. ......................... 426/574; 426/656; 426/615; 426/802; 426/575; 426/578; 426/506; 426/518
[58] Field of Search .................................. 426/574, 656, 426/615, 802, 575, 578, 506, 518

[56] References Cited

U.S. PATENT DOCUMENTS

| | | | |
|---|---|---|---|
| 4,173,657 | 11/1979 | Gaudio et al. | 426/574 |
| 4,276,319 | 6/1981 | Nguyen et al. | 426/574 |
| 4,563,360 | 1/1986 | Soucie et al. | 426/104 |
| 4,563,362 | 1/1986 | Thomas et al. | 426/104 |
| 4,777,059 | 10/1988 | Tanaka et al. | 426/656 |
| 5,160,758 | 11/1992 | Parks et al. | 426/506 |
| 5,433,969 | 7/1995 | McMindes et al. | 426/574 |
| 5,626,899 | 5/1997 | Payne et al. | 426/574 |

OTHER PUBLICATIONS

N.L. Cunningham, A.T. Bonkowski, W.B. Tuley *Soy Protein Use In Meat, Seafood*, Jaocs, vol. 65, No. 12 (Dec., 1988), pp. 1871–1873.

L.L. Parks, J.A. Carpenter *Functionality of Six Nonmeat Proteins In Meat Emulsion Systems,* Journal of Food Science, vol. 52, No. 2, 1987, pp. 271–278.

Matthew K. McMindes, *Applications of Isolated Soy Protein in Low–Fat Meat Products,* Food Technology, Dec., 1991, pp. 61–64.

*Primary Examiner*—Marian C. Knode
*Assistant Examiner*—Jay F. Williams
*Attorney, Agent, or Firm*—Laff, Whitesel, Conte & Saret, Ltd.

[57] ABSTRACT

A protein crumble having fat-like properties is made by using a soy protein which is mixed with water and then chopped and blended. Specific amounts of isolate soy protein or soy protein concentrate are preferred. Any of a number of ingredients including animal derived proteins, carbohydrates, and gums may be added to produce a fat-like attribute without actually adding fat.

31 Claims, No Drawings

PROCESS FOR MAKING EXTENDERS FOR LOWER FAT MEAT SYSTEMS

This is a continuation-in-part of patent application Ser. No. 08/482,878, filed Jun. 7, 1995 now U.S. Pat. No. 5,626,899 titled "Process for making vegetable-based meat extenders".

This invention relates to processes for using vegetable protein as meat enhancers and extenders, and more particularly to means for and methods of reducing costs, especially handling costs, for such meat extenders. Still more particularly, the invention relates to processes for making extenders for lower fat meat products.

BACKGROUND

For a background relative to meat extenders, reference may be made to the above-identified parent application Ser. No. 08/482,878, and to one or more of the following United States patents and the references cited thereon: U.S. Pat. Nos. 5,183,683; 5,160,758; and 4,276,319.

In order to provide a concrete example of a product using the inventive vegetable meat extender or "crumble", reference is made herein to a pepperoni product. However, this specific reference is not a limitation on the appended claims. Quite the contrary, the invention may find use in many coarse ground meat systems, for example, sausage, ground beef patties, etc.

These products may be used in a variety of meat products including but not limited to coarse ground fermented meats, meat patties, meatballs, nugget products, sausages and other coarse ground meats. Following the initial inventive process development of my co-pending application, additional work produced crumbles having various textures. Therefore, various combinations of ingredients were used to yield products with initial texture characteristics that both mimic fat and replace meat. Crumbles might also help to manage much of the traditional cooking loss. A major new development is an addition of powdered animal products, such as gelatin, caseinate and similar products. Additional work has shown new ways to modify the texture of these crumble products for inclusion in various meat products.

Because consumers, processors, and regulatory agencies are changing their attitudes, the use of soy protein products is increasing in processed meat systems. These soy products are added to various meat products in order to reduce their costs, improve their health qualities, etc. The soy products contribute nutrition, flavor, and valuable functional properties when used as partial meat substitutes, binders, emulsifiers, meat flavor enhancers, brine ingredients, and meat analogs.

Most of the current domestic meat applications for soy protein are in comminuted and coarsely ground meat products, with the coarsely ground meat being the largest area. In finely chopped meats, such as frankfurters and bologna, soy protein isolates are used for their moisture and fat binding, fat emulsifying, and stabilizing properties. These functional properties make them ideal ingredients for use in processed meat products, both coarse and fine emulsions (e.g., patties, loaves, and sausages).

In these meats (meat patties, meat balls, chili, Salisbury steaks, pizza toppings, and meat sauces among others) textured soy proteins are the ingredients of choice. When making patties, it is necessary to add water at levels which are 2 to 3 times the weight of the textured soy protein. If too little water is used to hydrate the textured protein, the finished meat product is too dry. A good guide for hydrating soy products is to achieve a protein level of about 18% in the hydrated form.

In patties, the primary functions of soy protein products are to give structure during cooking and to reduce cooking losses. When properly used, the patty is more moist, will have a higher protein and lower fat content, and thus be better balanced nutritionally.

Several studies with beef patties containing soy protein products indicate that up to 20% hydrated textured soy protein product would be acceptable to the consumer, based on various palatability characteristics. In supplementing ground meat in a patty-type product, up to about 20% substitutions can be made without flavor adjustment. Above this level, additional seasonings may be required to offset the dilution effect of the meat flavor.

The flaked form in a textured soy product assures rapid hydration, which makes the ingredient well-suited for high volume applications. Its meat-like appearance and mouth-feel remain intact throughout strenuous retort and freeze-thaw conditions. It also contributes to overall fat stabilization.

Isolated soy proteins ("ISP") are by far the most versatile of the soy derivatives. Isolates are the most highly refined soy protein products which are commercially available, but they also represent the major proteinaceous fraction of the soybean. Soy protein isolates are prepared from dehulled and defatted soy-beans by removing most of the non-protein components so that the remaining product contains not less than 90% protein on a moisture-free basis.

These soy protein isolates can be utilized to impart such properties as viscosity, adhesiveness, cohesiveness, springiness, and juiciness, and are highly dispersible, soluble and functional products. In meat applications, they are designed to replace a portion of salt soluble meat proteins, bind fat and water, stabilize emulsions and help ensure maintenance of the structure in finished cooked products. Matching specific functional requirements with the proper selection of these isolated soy proteins will result in cost savings and process efficiencies.

Soy protein concentrates are derived from defatted soy flakes through an aqueous alcohol process or acid precipitation. Soy protein concentrate contains a high percentage of soluble protein, giving it superior dispersibility, solubility and emulsification properties, with a good flavor profile. It is an extremely functional soy protein supplement designed to improve texture and mouth-feel of food products by fortifying the myofibrillar proteins found in fish, meats, and poultry. It has a very bland flavor and can be used to fortify the protein content of food products.

Many of the soy proteins used in the various examples described herein are commercially available from the Archer Daniels Midland Company ("ADM") of Decatur, Ill. ADM soy protein isolate products, which are sold under the trademarks "PRO-FAM" and "ARDEX", are dry products which are highly dispersible, soluble, and functional. Another ADM product, sold under the trademark "ARCON", is a soy protein concentrate which has dispersibility, solubility and emulsification properties, with an excellent flavor profile.

Each of these and similar ADM products mentioned in the examples have been used for many years by food processors. These ADM soy protein isolates and concentrates are high quality proteins made from soybeans. Amino acid content and digestibility are two of the factors that make soy proteins high quality. The quality of the proteins may be measured by using known protein quality evaluation techniques. Therefore, it is highly desirable for any new process to make a meat extending protein crumble begin by using as many of the existing procedural steps as possible in order to eliminate the need for special training and to preserve existing production facilities.

Prior processes for making and using protein crumble have involved shipping frozen isolated soy protein, which means that the shipper has paid substantial freight and refrigeration charges for shipping ice. There would be a substantial savings if the material for making the crumble could be shipped in a dry form.

SUMMARY OF THE INVENTION

Accordingly, an object of this invention is to provide new and novel processes for producing protein crumble, and more particularly, for producing crumbles having greater fat-like properties. Here, an object is to eliminate the need for shipping a wet product with a consequential higher transportation cost.

Another object of the invention is to provide new and novel low fat soy protein crumble while preserving as much of the food processor's existing facilities as possible. Here, an object is to enable a multi-product production line where soy protein isolates may follow a single series of production steps before a feed stream branches off into separate product lines, one of which is the new and novel produce line for producing protein crumble.

In keeping with an aspect of the invention, these and other objects are accomplished by a new and improved process wherein:

1. protein crumbles are manufactured at ambient room temperature (15° to 25° C.).
2. Dry "PRO-FAM" or "ARDEX" isolated soy proteins are initially hydrated at ratios of about 3.5–5.0 parts of water to 1 part of protein.
3. The resulting hydrated soy protein isolate is chopped until a gel-like material is formed.
4. Various other food ingredients (e.g. isolated soy proteins, soy protein concentrate, starch, wheat gluten, xanthan gum, locust bean gum, carrageenan, pectin and guar gum) are added.
5. The resulting product is chilled overnight and ground or chopped to form a soy protein crumble.

Animal products such as gelatin, egg albumin, blood plasma, and the like, may be added to improve texture and fat-like properties in the end product.

DETAILED DESCRIPTION OF THE INVENTION

In order to provide a control according to a prior art method for comparison and analysis with the inventive crumble, isolate crumbles were made from a soy protein isolate by chopping one part functional soy protein isolate with three parts hot water (60° C.) for approximately 4 minutes. The ratio of soy isolate to water was in the range of 2 to 3.5 parts of water to one part of soy isolate protein. A crumble made by this prior art process was used as a control in order to ascertain the amount of improvement provided by the inventive crumble.

The following six formulations are various examples of food ingredient combinations tested for their ability to provide a soy isolate crumble using ambient temperature (~75° F.; 24° C.) tap water. The formulations are set forth in terms of parts or percent (by weight).

EXAMPLE 1

A blend of isolated soy protein ("ISP") and xanthan/locust bean gum ("Xan/LBG") was formed when 1 part soy protein isolate was chopped with 3.75 parts tap water (24° C.) for about three minutes. The Xan/LBG was mixed together and chopped with the hydrated isolate for two additional minutes.

EXAMPLE 2

Isolated soy protein and starch were blended as follows: 1 part isolate with 3.75 parts water were chopped for three minutes in order to hydrate the isolate. Starch (Mira Flow, National Starch and Chemical Co.) was added 0.5 parts at a time until the product maintained consistency. A total of 2.5 parts of starch was added. The chopping time was extended to enable the repeated addition of the 0.5 parts starch.

EXAMPLE 3

Isolated soy protein and soy protein concentrate (SPC) were blended, as follows: 1 part isolated soy protein was chopped with 4.0 parts water for 3 minutes. Then 0.5 part soy protein concentrate was added and chopping continued for an additional 2 minutes.

EXAMPLE 4

Isolated soy protein and wheat gluten were blended, with a procedure which mirrored the procedure of Example 3.

EXAMPLE 5

Isolated soy protein and Xan/LBG (2×) were blended, using a procedure which was identical to the procedure of Example 1 except that the amount of Xan/LBG was doubled.

EXAMPLE 6

Isolated soy protein and soy protein concentrate were blended with Xan/LBG (1×), as follows: 1 part isolate was chopped with 4.0 parts water for 3 minutes. Next, 0.5 part soy protein concentrate was added and chopping continued for an additional 1 minute. Then, Xan/LBG was added and the mixture was chopped for an additional 1 minute.

TABLE 1

| | | Screening Formulations (Parts) | | | | | | |
|---|---|---|---|---|---|---|---|---|
| Example | Treatment | Parts ISP | Parts Water (Temp) | Xan (% form.) | LBG (% form.) | Parts Starch | Parts SPC (Arcon S) | Parts Gluten |
| | Control | 1.0 | 3.0 (60° C.) | — | — | — | — | — |
| 1 | ISP + Xan/LBG | 1.0 | 3.75 | 0.125% | 0.125% | — | — | — |
| 2 | ISP + Starch | 1.0 | 3.75 | — | — | 2.5 | — | — |
| 3 | ISP + SPC | 1.0 | 4.0 | — | — | — | 0.5 | — |
| 4 | ISP + Wheat Gluten | 1.0 | 4.0 | — | — | — | — | 0.5 |
| 5 | ISP + Xan/LBG (2X) | 1.0 | 4.0 | 0.3% | 0.3% | — | — | — |
| 6 | ISP + SPC + Xan/LBG(1X) | 1.0 | 4.0 | 0.15% | 0.15% | — | 0.5 | — |

TABLE 2

Screening Formulations (%)

| Example | Treatment | ISP (%) | Water (%) | Xan (%) | LBG (%) | Starch (%) | SPC (%) (Arcon S) | Gluten (%) | Total |
|---|---|---|---|---|---|---|---|---|---|
|  | Control | 25.0 | 75.0 | — | — | — | — | — | 100.00 |
| 1 | ISP + Xan/LBG | 21.0 | 78.75 | 0.125 | 0.125 | — | — | — | 100.00 |
| 2 | ISP + Starch | 13.8 | 51.7 | — | — | 34.5 | — | — | 100.00 |
| 3 | ISP + SPC | 18.2 | 72.7 | — | — | — | 9.1 | — | 100.00 |
| 4 | ISP + Wheat Gluten | 18.2 | 72.7 | — | — | — | — | 9.1 | 100.00 |
| 5 | ISP + Xan/LBG (2X) | 20.0 | 79.4 | 0.3 | 0.3 | — | — | — | 100.00 |
| 6 | ISP + SPC + Xan/LBG(1X) | 18.2 | 72.5 | 0.15 | 0.15 | — | 9.0 | — | 100.00 |

The six formulations of the products made in the preceding examples were placed in a cooler overnight (2°–4° C.). The following day, the cooled gels were ground (3/16" plate) and evaluated for their potential of forming a cohesive crumble with the proper mouth-feel. The following Table 3 sets forth the test results:

TABLE 3

| Example | Treatment | Actual Chop Time | Evaluation of Crumble |
|---|---|---|---|
|  | Control | 5 min. | Good, firm |
| 1 | ISP + Xan/LBG | 5 min. | Good, firm |
| 2 | ISP + Starch | 6–7 min. | Grainy, soft |
| 3 | ISP + SPC | 5 min. | Good, firm |
| 4 | ISP + Wheat Gluten | 6 min. | Marginal, soft |
| 5 | ISP + Xan/LBG (2X) | 5 min. | Soft |
| 6 | ISP + SPC + Xan/LBG(1X) | 5 min. | Good, firm |

EXAMPLE 7

Pepperoni was manufactured by using the inventive crumble. Based on the screening evaluation set forth in Table 3, crumbles made by the methods of Examples 3 and 6 demonstrated the most potential for forming a properly textured crumble for use in the pepperoni.

The formulations of Examples 3 and 6 were prepared again and tested in a reduced fat traditional pepperoni formulation. The crumble formulations and chopping times were modified as listed in Table 4 below. In formulations containing SPC, the ISP was chopped 3 minutes followed by the addition of the SPC at the beginning of the final 1 minute of chopping. The spice/flavoring blend (Diversitech Colorlife™) was added during the final 30 to 45 seconds of crumble manufacture to prevent large color variations between the meat and protein crumble portions of the product.

TABLE 4

| Treatment | Chop Time | Final Temp (°C.) | Evaluation of Crumble |
|---|---|---|---|
| Example 3 | 4 minutes | 27.9 | Good, firm |
| Example 6 | 4 minutes | 29.9 | Good, firm |

TABLE 5

Test Formulations (Parts)

| Treatment | Parts ISP | Parts Water | Xan (% form.) | LBG (% form.) | Parts SPC (Arcon S) | Colorlife ™ Season. |
|---|---|---|---|---|---|---|
| Example 3 | 1.0 | 4.0 | — | — | 0.4 | 0.4% |
| Example 6 | 1.0 | 4.0 | 0.1% | 0.1% | 0.4 | 0.4% |

TABLE 6

Test Formulations (%)

| Treatment | ISP (%) | Water (%) | Xan (% form.) | LBG (% form.) | SPC (%) (Arcon S) | Colorlife ™ Season. |
|---|---|---|---|---|---|---|
| Example 3 | 18.2 | 72.7 | — | — | 9.1 | 0.4% |
| Example 6 | 18.4 | 73.7 | 0.1% | 0.1% | 7.3 | 0.4% |

Following the crumble manufacture, the product was chilled overnight, ground 3/16" and incorporated into the following pepperoni formulation:

TABLE 7

Pepperoni Test Formulations

| Ingredient | Traditional Formulation (32% Fat, Control) | Reduced Fat Formulation (20% Fat) |
|---|---|---|
| Pork (95% lean) | 19.4 | 38.2 |
| Pork (72% lean) | 52.50 | 32.70 |
| Beef (50/50's) | 24.00 | 15.00 |
| Protein Gels | 0.00 | 10.00 |
| Nitrite | 0.007 | 0.007 |
| Nitrate | 0.028 | 0.028 |
| Salt | 3.10 | 3.10 |
| Dextrose | 0.60 | 0.60 |
| Colorlife ™ (Flavoring) | 0.38 | 0.38 |
| Starter Culture | 0.02 | 0.02 |
| (Diversitech, HP-culture) |  |  |
| TOTALS | 100.00 | 100.00 |

Product Preparation of Pepperoni

The following process was used to prepare the pepperoni formulation as set forth on Table 7.

1. Coarse grind meat raw materials (½").
2. Place in mixer and add salt, nitrite/nitrate & dextrose and mix to incorporate ingredients. Mix minimally to prevent heat build-up and fat smearing.

3. Add Colorlife™/starter culture (~0.4% Colorlife™; 0.02% Starter Culture, Diversitech HP frozen) and mix to incorporate.
4. Add protein crumbles and mix to distribute.
5. Grind product again (3/16").
6. Stuff product into 2" (fibrous casings). The product should be kept cold to prevent fat smearing during stuffing step.
7. Temper product at 70° F. (21° C.) for 2 to 4 hours.
8. Ferment product at 100° F. (38° C.) and 85–90% RH for 12–14 hours or until pH reaches 5.1 or less.
9. Thermally process the product as indicated in the cooking cycle listed below.
10. Following fermentation and thermal processing the pepperoni sticks were placed in a 45°–55° F. (7°–13° C.) room at 40–60%RH and allowed to dry to a moisture-:protein ratio of 1.6:1 (~3–4 weeks).

TABLE 8

| STAGE | TIME | INTERNAL TEMP (°F.) | SMOKE | DRY BULB (°F.) | WET BULB (°F.) | AUTO DAMPER |
|---|---|---|---|---|---|---|
| 1 | 30 | — | — | 110 | 0 | on |
| 2 | 60 | — | — | 120 | 107 | on |

Hot/cold shower, temper.

The resulting pepperoni was judged completely successful. Both of the modified crumble formulations (Examples 3 and 6) produced pepperoni that compare closely to the traditional pepperoni manufactured as a control. The comparison was made in sensory quality as well as physical attributes such as particle definition, sliceability and textural changes during cooking.

Low Fat Crumble

The foregoing description, examples, and conclusions were parts of the original invention that is described in the parent application Ser. No. 08/482,878, filed Jun. 7, 1995. In general, these crumbles were excellent; however, the current market demand is to provide low fat products. Therefore, the present invention is directed to producing crumbles having equal or better fat-like properties and/or texture characteristics than those that are described in the preceding examples.

Primary Screening

Prior to a comprehensive evaluation, ingredients were screened for their ability to produce a crumble piece with the necessary handling characteristics. Ingredients that were screened included all of the following materials:

Screening of Ingredients

Initial gels were chopped in a robot coupe food processor, set on high speed, for 3 minutes with 2 intermittent stops to clean the sides of the chopper. When other ingredients were added, the initial gel was chopped for 2 minutes and then the other ingredients were added and chopped for 1 minute, for a total of 3 minutes chopping time. The viscous gel mass was then bagged, sealed, and chilled (~2° C.). After 12–16 hours, the products were ground to form particles having a size of approximately 3/16" and subjectively evaluated for the potential to produce an acceptable crumble.

Selection of formulations with potential

Ideal properties for most meat applications would be the ability of the product to 1) maintain the crumble integrity during its mixing and distribution throughout a product, 2) be easy to manufacture, 3) be able to reduce cost and 4) maintain traditional product quality.

Following the selection of products from the initial screening, selected formulations were scaled-up to be processed in traditional meat processing equipment in order to determine how well they could be manufactured commercially.

Materials and Methods

Initial gels were chopped using a Stancase/Vall bowl cutter. Chopping time was adjusted to reflect changes in equipment. Water and base gel material powder—Isolated Soy Protein (ISP) or Soy Protein Concentrate (SPC)—were chopped 3 minutes to hydrate the food ingredient. Additional ingredients were added after initial gel manufacture and chopping continued for an additional 2 minutes. Of the total 5 minutes of chopping time, the first minute was at a bowl cutter speed that was slower than the remaining 4 minutes. Within the initial base gels, the same lots of soy protein were used to minimize variation from protein source. "ProFam"® 974 was used as the isolated soy protein (ISP) source with a gel strength of over 800. "Arcon® S" was the SPC source.

Crumble Evaluations

Gels were refrigerated overnight and ground to a particle size of 3/16" by using a butcher boy grinder. After grinding 400 g of chilled product was vacuum-packaged in a Kramer-Grebe Compack Vacuum-packaging machine in 8×12 Wetoska bags (VAK*3R), using a machine setting of 2. Packages were refrigerated 1 hour and then crumbled by hand. Scores were assigned to the crumble, based on the following scales.

Rubbery

The degree to which samples spring back after relaxing a pressure applied by squeezing by hand. The scale used was 0 (Pasty/soft; deforms with pressure and remains deformed) to 5 (Rubbery/elastic; deforms with pressure and returns to original shape when force is removed).

| Proteins | Gums/Hydrocolloids | Starch/Starch Products |
|---|---|---|
| Isolated soy protein | Guar gum | Tapioca starch |
| Soy protein concentrate | Xanthan | Native potato starch |
| Gelatin | Locust bean gum | Wheat starch |
| Egg albumin | Pectin/ CaCO$_3$ | High amylose corn |
| Blood plasma (beef) | Carrageenan | Hydrolyzed oat and/or corn flour |
| Deheated mustard flour | low gel Iota | (β-glucan containing) |
| Sodium caseinate | medium gel Iota-type blend | Modified instant corn |
| Wheat gluten | high gel Kappa | Modified waxy maize |
|  |  | Modified corn starch |
|  |  | Modified potato starch (instant pregelatinized) |
|  |  | Modified tapioca |

Discrete Particles

The degree to which the crumbles remain as individual particles after grinding and initial vacuum compaction for 1 hour. Scale of 0 (cohesive mass) to 5 (Individual particles).

Fat-like Properties

The degree to which a crumble had fat-like properties as indicated by an oily or slick surface feel by touch. Scale 0 (dry, sticky) to 5 (slick oily).

Instrumental texture

Overall texture of crumbles were measured with a TA-XT2 texture analyzer using a shear cell. 100 g crumbles were loaded into a shear cell and both peak force and total energy (sum of force over the shear range) are reported. Reported values are the average of 3 shears.

All tests were performed at 6.0° C.±3 unless otherwise indicated.

Results and discussion

All formulations that were scaled-up are contained in Tables 9 (by ingredient parts) and 10 (by ingredient percents). Table 11 contains subjective and instrumental texture values and evaluates the potential for use as either a meat replacement or a fat mimic. Many of the tested formulations had a potential for such use as either a meat replacer or as a texture modifier, especially with references to fat replacers. The following general discussion sets forth the potential for a particular ingredient/ingredient combination.

Combinations of soy protein isolate (ISP) and soy protein concentrate (SPC) and the importance of the initial raw material When crumbles were made using 1:4 ISP gels+single ingredients other than SPC, the crumbles which were formed had marginal properties. Combinations of ISP+ISP or ISP+SPC with other ingredients are the most effective means of producing crumbles with the proper texture. The studies of these combinations used the minimum level of ingredients necessary to produce a crumble with the desired properties. In many cases, additional amounts of these ingredients could improve crumble properties, but that raises an issue of cost effectiveness.

The SPC added to other ingredients (non-ISP) did not form particularly satisfactory crumbles. The exception would be where other ingredients provide the initial structure (eg. SPC+Gluten+Gelatin). Although it is possible to manufacture crumbles with many combinations of ingredients both ISP+ISP and ISP+SPC formulations appear to be very effective and simple formulations to produce a crumble with the properties desired to replace meat. The SPC containing formulations would likely have some cost advantages.

Initial soy functionality is important if a firm, rubbery crumble is desired. Gel strength in the upper medium to high range is preferred with high gel strength material being the most preferred. Gel strength appears to be less critical when the ingredients are added after the initial base gel formation. For example, SPC has a low gel strength and will not form a stable crumble when it is used as the base. However, a stable crumble may be formed when SPC is added to a base gel of ISP.

Starch/starch product incorporation

Although starch makes the crumble more fragile when compared with other formulations, starch does tend to whiten the crumbles and make them appear more fat-like. This fat-like appearance is a desired characteristic for a fat replacer used in making a reduced fat salami or other product where a distinct particle definition is a traditional attribute of the product. Products containing β-glucans mixtures and starch products with xanthan gum appear to be at least partially effective in increasing the slickness of the crumble surface and thus the perception of fat.

Gum addition

Small amounts of gum/hydrocolloids added to 1:4 ISP+ISP (0.33 parts) or 1:4 ISP+SPC (0.4 parts) base gels improve the slick feel of the crumbles. This makes them more effective for replacing higher fat raw materials. Although no formulations were tested with ISP+ISP+gums, these formulations are similar to or slightly better textured than the ISP+SPC+gum formulations that were tested and would behave similarly to these formulations. Guar gum is very effective at producing a slick feel, but higher levels of this gum interfere with the strength of the crumble. Pectin was only slightly more effective at modifying the texture of the crumble product. Carrageenans were effective especially when used in an ISP+SPC formulations.

Gluten addition

When used at higher levels, gluten adds strength/integrity to the crumbles but also tends to make the crumbles more cohesive. Gluten addition in the 0.05 to 0.25 part range will add some crumble strength without making the crumble excessively cohesive. Gluten is more effective when added to ISP+ISP or ISP+SPC formulations rather than trying to use excess gluten (ISP+Gluten or SPC+Gluten) to achieve the proper texture since excess gluten makes the product more like a dough and less able to form individual particles.

Na Caseinate

While ISP+caseinate produced crumbles that were sticky and cohesive, combinations of ISP+SPC+caseinate produced crumbles that were firm, separate, and somewhat rubbery.

Gelatin

Gelatin was very effective at producing a crumble with an elastic and resilient structure. Crumbles with gelatin were maintained as individual particles of uniform size and shape. All gelatin containing formulations produced crumbles with the proper characteristics, especially ISP+SPC+gelatin. The ISP+gelatin combinations were also successful, but this combination is likely to encounter cost restrictions.

Additional observations—Industry practices

The inventive process is adaptable to current industry practices of producing a 1:4 (protein:water) gel that has been refrigerated overnight.

The process is altered by producing a 1:4 gel (protein:water) in a bowl chopper, removing the gel and refrigerating the gel for a period of time (usually 6–24 hours).

The gel is then returned to the chopper. Additional dry ingredients are added while chopping to produce a crumble gel. This crumble gel is then subdivided into crumbles if of the proper consistency, or refrigerated and subdivided into crumbles.

This process allows for a gel raw material (typical in many meat plants worldwide) to be used in a variety of products requiring different processing methods. For example, a large batch of 1:4 gel could be divided and used in both the manufacture of frankfurters and the production of crumbles for low fat pepperoni.

Data indicates that crumbles produced by this process are essentially equal to or better than previous crumbles given the same gel strength ISP source (see Table 12). Hence, this process enables a production of a general base material that can be used in many currently used processing applications with a flexibility for easily manufacturing a crumble from this base product.

TABLE 9

Parts Formulation
Ingredients by Parts in Crumble Formulation

| | Base Gel Used | | | Other Ingredients Added to Gel | | | | | | | |
|---|---|---|---|---|---|---|---|---|---|---|---|
| Label | ISP | SPC | Water | ISP | SPC | Gluten | Gelatin | Sodium Caseinate | Gums/ hydrocol. | Starch/ Starch Prod. | Ingred. Type |
| 1 | 1.25 | | 3.75 (60° C.) | | | | | | | | |
| 2 | 1.25 | | 3.75 | | | | | | | | |
| 3 | 1.00 | | 4.00 | 0.330 | | | | | | | |
| 4 | 1.00 | | 4.00 | | 0.500 | | | | | | |
| 5 | 1.00 | | 4.00 | | 0.250 | | | | | | |
| 6 | 1.00 | | 4.00 | 0.330 | | | | | | | |
| 7 | 1.00 | | 4.00 | | 0.250 | | | | 0.025 | | C-A |
| 8 | 1.00 | | 4.00 | | 0.250 | | | | 0.060 | | Pectin |
| 9 | 1.00 | | 4.00 | | | 0.750 | | | | | |
| 10 | 1.00 | | 4.00 | | | 0.750 | | | 0.025 | | C-A |
| 11 | 1.00 | | 4.00 | 0.330 | | | | | | | |
| 12 | 1.00 | | 4.00 | | | | 0.300 | | | | |
| 13 | 1.00 | | 4.00 | | 0.250 | | | | 0.020 | | X/LBG |
| 14 | 1.00 | | 4.00 | | 0.250 | | | | | 0.250 | S-A |
| 15 | 1.00 | | 4.00 | | 0.250 | | 0.250 | | | | |
| 16 | 1.00 | | 4.00 | 0.330 | | | | | | | |
| 17 | 1.00 | | 4.00 | | | | | | 0.020 | | X/LBG |
| 18 | 1.00 | | 4.00 | | | | | | 0.025 | | C-C |
| 19 | 1.00 | | 4.00 | | | | | | 0.025 | | C-B |
| 20 | 1.00 | | 4.00 | | | | | | 0.025 | | C-A |
| 21 | 1.00 | | 4.00 | | | | | | 0.130 | | Pectin |
| 22 | 1.00 | | 4.00 | | | | | 0.200 | | | |
| 23 | 1.00 | | 4.00 | | 0.400 | | | | | | |
| 24 | 1.00 | | 4.00 | | 0.250 | | | | 0.020 | | X/LBG |
| 25 | 1.00 | | 4.00 | | 0.250 | | | | 0.025 | | C-A |
| 26 | 1.00 | | 4.00 | | 0.250 | | | | 0.130 | | Pectin |
| 27 | 1.00 | | 4.00 | | 0.250 | | 0.050 | | | | |
| 28 | 1.00 | | 4.00 | | 0.250 | | | 0.100 | | | |
| 29 | 1.00 | | 4.00 | | 0.250 | | | | 0.050 | | Guar Gum |
| 30 | | 1.00 | 4.00 | | 0.400 | | | | | | |
| 31 | 1.00 | | 4.00 | | 0.250 | 0.250 | | | | | |
| 32 | 1.00 | | 4.00 | | 0.250 | | | | 0.025 | | C-C |
| 33 | 1.00 | | 4.00 | | 0.250 | | | | 0.025 | | C-B |
| 34 | 1.00 | | 4.00 | | 0.250 | | 0.100 | | | | |
| 35 | | 1.00 | 4.00 | | | 0.500 | | | 0.025 | | C-A |
| 36 | | 1.00 | 4.00 | | | 0.750 | | | | | |
| 37 | | 1.00 | 4.00 | | | 0.500 | 0.100 | | | | |
| 38 | 1.00 | | 4.00 | | 0.250 | | | | | 0.100 | S-B |
| 39 | 1.00 | | 4.00 | | 0.250 | | | | | 0.100 | S-C |
| 40 | 1.00 | | 4.00 | | 0.250 | | | | | 0.100 | S-D |
| 41 | 1.00 | | 4.00 | | 0.250 | | | | | 0.100 | S-E |
| 42 | 1.00 | | 4.00 | | | | | | 0.010 | | Guar gum |
| 43 | 1.00 | | 4.00 | | | | | | | | |
| 44 | 1.00 | | 4.00 | | 0.250 | | | | | 0.100 | S-F |
| 45 | 1.00 | | 4.00 | | 0.250 | | | | | 0.100 | S-G |
| 46 | 1.00 | | 4.00 | 0.330 | | | | | | | |
| 47 | 1.00 | | 4.00 | | 0.250 | 0.250 | | | | | |
| 48 | 1.00 | | 4.00 | | 0.400 | | | | | | |

Legend Table 9
a-Specific Type footnoted
ISP = Isolated Soy Protein ProFam ® 974, high gel; Archer Daniels Midland Co.
SPC = Soy Protein Concentrate, Arcon ® S; Archer Daniels Midland Co.
Gluten = Wheat Gluten, Whetpro ® 80; Archer Daniels Midland Co.
Gelatin = Commercial, 250 bloom
Sodium Caseinate = DMV high viscosity caseinate
Gums/Hydrocolloids
Carrageenan
C-A = Gelcarin ® ME389, Low gel Iota; FMC Corp.
C-B = Gelcarin ® ME621, Medium gel Iota-type blend; FMC Corp.
C-C = Gelcarin ® ME911, High gel Kappa; FMC Corp.
Guar = TIC Gums
Pectin = Hercules; LM 1912 CS2
X/LBG = Xanthan/Locust Bean Gum (50:50)
Xanthan gum; food grade, 200 mesh
Locust bean gum; food grade, 100 mesh
Starch/Starch Products
S-A = StaSlim ® 142; A.E. Staley Manufacturing; modified instant tapioca starch
S-B = FirmTex ® ; National Starch and Chemical Co.; modified waxy maize

TABLE 9-continued

Parts Formulation
Ingredients by Parts in Crumble Formulation

| | Base Gel Used | | | Other Ingredients Added to Gel | | | | | | |
|---|---|---|---|---|---|---|---|---|---|---|
| Label | ISP | SPC | Water | ISP | SPC | Gluten | Gelatin | Sodium Caseinate | Gums/ hydrocol. | Starch/ Starch Prod. | Ingred. Type |

S-C = TrimChoice ® OC; A.E. Staley Manufacturing; hydrolyzed oat and corn flour
S-D = Farinex ® FVA-15; Avebe Corp.; modified potato starch
S-E = Hylon ® V; National Starch and Chemical Co.; high amylose maize
S-F = Potato Starch; Avebe Corp.; unmodified potato starch
S-G = Stellar ® 100X; A.E. Staley Manufacturing;
[b]-unless indicated, room temperature (8–25° C.)water was used.

TABLE 10

Formulation by Percent
Ingredients by Percent in Crumble Formulation

| Label | Base Gel Used | | | Other Ingredients Added to Gel | | | | | | | |
|---|---|---|---|---|---|---|---|---|---|---|---|
| | ISP | SPC | Water | ISP | SPC | Gluten | Gelatin | Sodium Caseinate | Gums/ hydrocol. | Starch/ Starch Prod. | Ingred. Type |
| 1 | 25.0 | | 75.0 (~60° C.) | | | | | | | | |
| 2 | 25.0 | | 75.0 | | | | | | | | |
| 3 | 18.8 | | 75.0 | 6.2 | | | | | | | |
| 4 | 18.2 | | 72.7 | | | 9.1 | | | | | |
| 5 | 19.0 | | 76.2 | | | 4.8 | | | | | |
| 6 | 18.8 | | 75.0 | 6.2 | | | | | | | |
| 7 | 19.0 | | 75.8 | | | 4.7 | | | 0.5 | | C-A |
| 8 | 18.8 | | 75.3 | | | 4.7 | | | 1.1 | | Pectin |
| 9 | 17.4 | | 69.6 | | | | 13.0 | | | | |
| 10 | 17.3 | | 69.3 | | | | 13.0 | | 0.4 | | C-A |
| 11 | 18.8 | | 75.0 | 6.2 | | | | | | | |
| 12 | 18.9 | | 75.5 | | | | | 5.7 | | | |
| 13 | 19.0 | | 75.9 | | | 4.7 | | | 0.4 | | X/LBG |
| 14 | 18.2 | | 72.7 | | | 4.5 | | | | 4.5 | S-A |
| 15 | 18.2 | | 72.7 | | | 4.5 | 4.5 | | | | |
| 16 | 18.8 | | 75.0 | 6.2 | | | | | | | |
| 17 | 19.9 | | 79.7 | | | | | | 0.4 | | X/LBG |
| 18 | 19.9 | | 79.6 | | | | | | 0.5 | | C-C |
| 19 | 19.9 | | 79.6 | | | | | | 0.5 | | C-B |
| 20 | 19.9 | | 79.6 | | | | | | 0.5 | | C-A |
| 21 | 19.5 | | 78.0 | | | | | | 2.5 | | Pectin |
| 22 | 19.2 | | 76.9 | | | | | 3.8 | | | |
| 23 | 18.5 | | 74.1 | | | 7.4 | | | | | |
| 24 | 19.0 | | 75.9 | | | 4.7 | | | 0.4 | | X/LBG |
| 25 | 19.0 | | 75.8 | | | 4.7 | | | 0.5 | | C-A |
| 26 | 18.6 | | 74.3 | | | 4.6 | | | 2.4 | | Pectin |
| 27 | 18.9 | | 75.5 | | | 4.7 | 0.9 | | | | |
| 28 | 18.7 | | 74.8 | | | 4.7 | | 1.9 | | | |
| 29 | 18.9 | | 75.5 | | | 4.7 | | | 0.9 | | Guar Gum |
| 30 | | 18.5 | 74.1 | | | 7.4 | | | | | |
| 31 | 19.0 | | 75.8 | | | 4.5 | 4.5 | | | | |
| 32 | 19.0 | | 75.8 | | | 4.7 | | | 0.5 | | C-C |
| 33 | 19.0 | | 75.8 | | | 4.7 | | | 0.5 | | C-B |
| 34 | 18.7 | | 74.8 | | | 4.7 | 1.9 | | | | |
| 35 | | 18.1 | 72.4 | | | 9.1 | | | 0.5 | | C-A |
| 36 | | 17.4 | 69.6 | | | 13.0 | | | | | |
| 37 | | 17.9 | 71.4 | | | 8.9 | 1.8 | | | | |
| 38 | 18.7 | | 74.8 | | | 4.7 | | | | 1.9 | S-B |
| 39 | 18.7 | | 74.8 | | | 4.7 | | | | 1.9 | S-C |
| 40 | 18.7 | | 74.8 | | | 4.7 | | | | 1.9 | S-D |
| 41 | 18.7 | | 74.8 | | | 4.7 | | | | 1.9 | S-E |
| 42 | 20.0 | | 79.8 | | | | | | 0.2 | | Guar gum |
| 43 | 20.0 | | 80.0 | | | | | | | | |
| 44 | 18.7 | | 74.8 | | | 4.7 | | | | 1.9 | S-F |
| 45 | 18.7 | | 74.8 | | | 4.7 | | | | 1.9 | S-G |
| 46 | 18.8 | | 75.0 | 6.2 | | | | | | | |
| 47 | 18.2 | | 72.7 | | | 4.5 | 4.5 | | | | |
| 48 | 18.5 | | 74.1 | | | 7.4 | | | | | |

TABLE 10-continued

Formulation by Percent
Ingredients by Percent in Crumble Formulation

| | Base Gel Used | | | Other Ingredients Added to Gel | | | | | | |
|---|---|---|---|---|---|---|---|---|---|---|
| La-bel | ISP | SPC | Water | ISP | SPC | Gluten | Gelatin | Sodium Caseinate | Gums/ hydrocol. | Starch/ Starch Prod. | Ingred. Type |

Legend Table 10
[a]-Specific Type footnoted
ISP = Isolated Soy Protein ProFam ® 974, high gel; Archer Daniels Midland Co.
SPC = Soy Protein Concentrate, Arcon ® S; Archer Daniels Midland Co.
Gluten = Wheat Gluten, Whetpro ® 80; Archer Daniels Midland Co.
Gelatin = Commercial, 250 bloom
Sodium Caseinate = DMV high viscosity caseinate
Gums/Hydrocolloids
Carrageenan
C-A = Gelcarin ® ME389, Low gel Iota; FMC Corp.
C-B = Gelcarin ® ME621, Medium gel Iota-type blend; FMC Corp.
C-C = Gelcarin ® ME911, High gel Kappa; FMC Corp.
Guar = TIC Gums
Pectin = Hercules; LM 1912 CS2
X/LBG = Xanthan/Locust Bean Gum (50:50)
Xanthan gum; food grade, 200 mesh
Locust bean gum; food grade, 100 mesh
Starch/Starch Products
S-A = StaSlim ® 142; A.E. Staley Manufacturing; modified instant tapioca starch
S-B = FirmTex ® ; National Starch and Chemical Co.; modified waxy maize
S-C = TrimChoice ® OC; A.E. Staley Manufacturing; hydrolyzed oat and corn flour
S-D = Farinex ® FVA-15; Avebe Corp.; modified potato starch
S-E = Hylon ® V; National Starch and Chemical Co.; high amylose maize
S-F = Potato Starch; Avebe Corp.; unmodified potato starch
S-G = Stellar ® 100X; A.E. Staley Manufacturing;
[b]-unless indicated, room temperature (8–25° C.)water was used.

TABLE 11

Texture Information by Formulation

| | | Texture Instrument Measurements | | Subjective Texture Scores[d] | | | Good Crumble |
|---|---|---|---|---|---|---|---|
| Label | Formulation Description[a,b,c] | Peak Force | Total Energy | Rubbery | Discrete Particles | Lubricity | Potential as Meat and/or Fat Repl.[e] |
| 1 | ISP (1:3) hot water (~60° C.) | 12.90 | 48.8 | 5.0 | 5.0 | 1.0 | X |
| 2 | ISP (1:3) | 9.30 | 34.6 | 5.0 | 4.5 | 3.0 | X |
| 3 | ISP + ISP | 9.50 | 35.9 | 5.0 | 4.5 | 2.0 | X |
| 4 | ISP + SPC | 12.80 | 48.3 | 5.0 | 4.5 | 1.0 | X |
| 5 | ISP + SPC | 7.80 | 28.8 | 4.0 | 4.0 | 3.0 | |
| 6 | ISP + ISP | 10.00 | 38.2 | 5.0 | 5.0 | 2.0 | X |
| 7 | ISP + SPC + C-A | 8.80 | 33.3 | 4.5 | 4.5 | 1.5 | X |
| 8 | ISP + SPC + Pectin | 7.80 | 27.9 | 4.0 | 4.5 | 1.0 | |
| 9 | ISP + Gluten | 13.70 | 45.6 | 4.0 | 2.0 | 1.5 | |
| 10 | ISP + Gluten + C-A | 14.00 | 46.7 | 3.5 | 2.0 | 1.0 | |
| 11 | ISP + ISP | 9.50 | 34.2 | 5.0 | 5.0 | 2.0 | X |
| 12 | ISP + Gelatin | 11.70 | 38.5 | 5.0 | 5.0 | 0.5 | X |
| 13 | ISP + SPC + X/LBG | 7.70 | 27.3 | 4.0 | 4.5 | 4.0 | X |
| 14 | ISP + SPC + S-A | 14.20 | 47.9 | 4.0 | 3.5 | 1.0 | X |
| 15 | ISP + SPC + Gelatin | 14.10 | 48.4 | 5.0 | 5.0 | 1.5 | X |
| 16 | ISP + ISP | 15.72 | 50.5 | 5.0 | 5.0 | 2.0 | X |
| 17 | ISP + X/LBG | 8.09 | 34.0 | 1.0 | 0.0 | 4.0 | |
| 18 | ISP + C-C | 6.40 | 23.7 | 3.0 | 3.0 | 2.5 | |
| 19 | ISP + C-B | 7.93 | 32.8 | 2.0 | 1.5 | 3.0 | |
| 20 | ISP + C-A | 4.97 | 19.2 | 4.0 | 4.0 | 3.0 | X |
| 21 | ISP + Pectin | 5.58 | 22.6 | 1.0 | 1.5 | 3.0 | |
| 22 | ISP + Caseinate | 10.31 | 39.7 | 3.0 | 1.0 | 1.0 | |
| 23 | ISP + SPC | 13.62 | 46.4 | 5.0 | 5.0 | 1.0 | X |
| 24 | ISP + SPC + X/LBG | 11.80 | 42.9 | 4.5 | 4.5 | 2.0 | X |
| 25 | ISP + SPC + C-A | 8.73 | 30.5 | 5.0 | 5.0 | 1.0 | X |
| 26 | ISP + SPC + Pectin | 10.60 | 37.2 | 2.5 | 4.5 | 2.0 | X |
| 27 | ISP + SPC + Gelatin | 12.68 | 41.8 | 5.0 | 5.0 | 2.5 | X |
| 28 | ISP + SPC + Caseinate | 11.63 | 38.4 | 4.0 | 4.5 | 2.5 | X |
| 29 | ISP + SPC + Guar | 5.31 | 19.6 | 1.5 | 1.5 | 5.0 | |
| 30 | SPC + SPC | 13.93 | 52.9 | 2.0 | 3.0 | 3.0 | |

TABLE 11-continued

Texture Information by Formulation

| Label | Formulation Description[a,b,c] | Texture Instrument Measurements | | Subjective Texture Scores[d] | | | Good Crumble Potential as Meat and/or Fat Repl.[e] |
|---|---|---|---|---|---|---|---|
| | | Peak Force | Total Energy | Rubbery | Discrete Particles | Lubricity | |
| 31 | ISP + SPC + Gluten | 15.74 | 53.0 | 5.0 | 4.5 | 2.0 | X |
| 32 | ISP + SPC + C-C | 9.35 | 32.7 | 4.5 | 5.0 | 2.0 | X |
| 33 | ISP + SPC + C-B | 9.52 | 35.5 | 4.5 | 5.0 | 2.0 | X |
| 34 | ISP + SPC + Gelatin | 12.36 | 42.0 | 5.0 | 5.0 | 1.0 | X |
| 35 | SPC + Gluten + C-A | 9.65 | 37.9 | 2.5 | 1.5 | 3.0 | |
| 36 | SPC + Gluten | 11.51 | 46.1 | 3.0 | 2.0 | 3.0 | |
| 37 | SPC + Gluten + Gelatin | 12.47 | 47.5 | 3.0 | 3.5 | 3.0 | |
| 38 | ISP + SPC + S-B | 9.96 | 35.3 | 4.5 | 4.5 | 2.5 | X |
| 39 | ISP + SPC + S-C | 10.72 | 38.4 | 4.5 | 4.5 | 2.5 | X |
| 40 | ISP + SPC + S-D | 9.13 | 32.9 | 4.0 | 4.0 | 2.5 | X |
| 41 | ISP + SPC + S-E | 10.09 | 34.4 | 4.0 | 4.0 | 2.5 | X |
| 42 | ISP + Guar | 5.54 | 22.8 | 4.0 | 4.0 | 4.5 | |
| 43 | ISP (1:4) | 8.48 | 36.1 | 4.0 | 0.0 | 2.0 | |
| 44 | ISP + SPC + S-F | 9.18 | 30.2 | 4.5 | 5.0 | 2.0 | X |
| 45 | ISP + SPC + S-G | 9.79 | 33.0 | 4.5 | 4.5 | 3.5 | X |
| 46 | ISP + ISP | 11.64 | 37.2 | 5.0 | 5.0 | 2.0 | X |
| 47 | ISP + SPC + Gluten | 13.14 | 44.3 | 4.5 | 4.5 | 3.0 | X |
| 48 | ISP + SPC | 11.76 | 38.0 | 5.0 | 5.0 | 2.0 | X |

Legend Table 11
[a]-Specific Type footnoted
ISP = Isolated Soy Protein ProFam ® 974, high gel; Archer Daniels Midland Co.
SPC = Soy Protein Concentrate, Arcon ® S; Archer Daniels Midland Co.
Gluten = Wheat Gluten, Whetpro ® 80; Archer Daniels Midland Co.
Gelatin = Commercial, 250 bloom
Sodium Caseinate = DMV high viscosity caseinate
Gums/Hydrocolloids
Carrageenan
C-A = Gelcarin ® ME389, Low gel Iota; FMC Corp.
C-B = Gelcarin ® ME621, Medium gel Iota-type blend; FMC Corp.
C-C = Gelcarin ® ME911, High gel Kappa; FMC Corp.
Guar = TIC Gums
Pectin = Hercules; LM 1912 CS2
X/LBG = Xanthan/Locust Bean Gum (50:50)
Xanthan gum; food grade, 200 mesh
Locust bean gum; food grade, 100 mesh
Starch/Starch Products
S-A = StaSlim ® 142; A.E. Staley Manufacturing; modified instant tapioca starch
S-B = FirmTex ® ; National Starch and Chemical Co.; modified waxy maize
S-C = TrimChoice ® OC; A.E. Staley Manufacturing; hydrolyzed oat and corn flour
S-D = Farinex ® FVA-15; Avebe Corp.; modified potato starch
S-E = Hylon ® V; National Starch and Chemical Co.; high amylose maize
S-F = Potato Starch; Avebe Corp.; unmodified potato starch
S-G = Stellar ® 100X; A.E. Staley Manufacturing;
[b]-unless indicated, room temperature (8–25° C.)water was used.
[c]-See Tables 9 or 10 for actual formulation
[d]-Rubbery = 0 (pasty soft, deforms) to 5 (rubbery elastic); Discrete Particles = 0 (cohesive mass) to 5 (individual particles); Fat-Like Properties = 0 (dry, sticky) to 5 (slick, oily);
[e]-Minimum discrete particle score of 3.5; minimum peak force of 8.0

TABLE 12

Alternate Crumble Producing Process[a]
Data from crumbles made with a 1:4 gel (refrigerated 6–24 hours)

| ID | Formulation[b,c] | Texture measurement Peak Force | Subjective Texture Scores[d] | | |
|---|---|---|---|---|---|
| | | | Rubbery score | Discrete particles | Lubricity |
| 8a | 1:4 ISP + 0.4 parts SPC | 20.14 | 5.0 | 5.0 | 1.5 |
| 8b | 1:4 ISP + 1.0 part SPC (Arcon ® F or VF) | 23.05 | 4.0 | 5.0 | 0.5 |
| 8c | 1:4 ISP + 0.25 parts SPC + 0.1 part gelatin | 15.75 | 5.0 | 5.0 | 1.5 |
| 8d | 1:4 ISP + 0.25 parts gelatin | 16.58 | 5.0 | 5.0 | 1.0 |
| 8e | 1:4 ISP + 0.25 parts SPC + 0.025 parts carrageenan | 11.11 | 5.0 | 4.5 | 2.5 |

TABLE 12-continued

Alternate Crumble Producing Process[a]
Data from crumbles made with a 1:4 gel (refrigerated 6–24 hours)

| ID | Formulation[b,c] | Texture measurement Peak Force | Subjective Texture Scores[d] | | |
|---|---|---|---|---|---|
| | | | Rubbery score | Discrete particles | Lubricity |
| 8f | 1:4 ISP + 0.25 parts SPC + 0.01 parts potato starch | 21.00 | 4.0 | 3.5 | 2.5 |
| 8g | 1:4 ISP + 0.25 parts SPC + 0.25 parts gluten | 14.37 | 4.5 | 4.5 | 3.0 |
| 8h | 1:4 ISP + 0.25 parts SPC + 0.01 parts guar gum | 10.62 | 3.5 | 3.5 | 3.5 |
| 8i | Control ISP (1:4) + 0.33 parts ISP | 13.40 | 5.0 | 5.0 | 1.5 |

[a]-Process Procedures
1-1:4 gel made and refrigerated about 6–24 hours
2-gel chopped second time with addition of dry ingredients
3-refrigerated, ground and used in products
[b]-Specific Type footnoted
ISP = Isolated Soy Protein ProFam ® 974, high gel; Archer Daniels Midland Co.
SPC = Soy Protein Concentrate, Arcon ® S or Arcon ® F or VF where indicated; Archer Daniels Midland Co.
Gluten = Wheat Gluten, Whetpro ® 80; Archer Daniels Midland Co.
Gelatin = Commercial, 250 bloom
Carrageenan = Gelcarin ® ME389, Low gel Iota; FMC Corp.
Guar = TIC Gums
Potato Starch; Avebe Corp.; unmodified potato starch
[c]-unless indicated, room temperature (8–25° C.)water was used.
[d]-Rubbery = 0 (pasty soft, deforms) to 5 (rubbery elastic); Discrete Particles = 0 (cohesive mass) to 5 (individual particles); Fat-Like Properties = 0 (dry, sticky) to 5 (slick, oily).

Those who are skilled in the art will readily perceive how to modify the invention. Therefore, the appended claims are to be construed to cover all equivalent structures which fall within the true scope and spirit of the invention.

The claimed invention is:

1. A process for making a protein crumble comprising the steps of:
   (a) chopping and blending one part of a material selected from a group consisting of soy protein isolate and soy protein concentrate with about 3.5 to 5.0 parts water at a temperature of about 10° to 40° C. for a period of about 2 to 10 minutes until said soy protein isolate is hydrated;
   (b) adding to the blend of step (a) at least one powdered food ingredient taken from a group consisting of vegetable proteins, complex carbohydrates and animal proteins;
   (c) chopping the material of step (b) for an additional period of about 2 to 5 minutes adequate for said blend (a) and powdered food ingredient of step (b) to form a viscous gel material;
   (d) cooling said viscous gel material of step (c) to about 0° to 10° C. for an enhancement of a textural integrity of the gel in step (c); and
   (e) disrupting said cooled viscous gel material into discrete protein crumbles for use as a fat replacer or meat extender.

2. The process of claim 1 wherein said temperature of step (a) is about 15°–25° C.

3. The process of claim 1 wherein said powdered food ingredient of step (b) is a combination of powdered food ingredients.

4. The process of claim 1 wherein ingredients in the blend of step (a) include about one part soy protein isolate and about 4 parts water; and
   the powdered food ingredient added in step (b) is additional soy protein isolate in an amount of about 0.25 parts to 0.5 parts of the total formulation weight.

5. The process of claim 4 wherein the soy protein isolate added in step (b) is about 0.3 parts of the total formulation weight.

6. The process of claim 1 wherein ingredients in the blend in step (a) include about one part soy protein isolate and about 4 parts water; and
   the powdered food ingredient added in step (b) is soy protein concentrate in an amount from about 0.25 parts to 0.75 parts of the total formulation weight.

7. The process of claim 6 wherein the added soy protein concentrate is about 0.4 to 0.6 parts of the total formulation weight.

8. The process of claim 1 wherein ingredients in the blend of step (a) include about one part soy protein isolate and about 4 parts water; and
   the powdered food ingredient added in step (b) is gelatin in an amount of about 0.1 parts to 0.3 parts of the total formulation weight.

9. The process of claim 8 wherein said ingredients in step (b) include about 0.25 parts of the total formulation weight.

10. The process of claim 1 wherein the ingredient in the blend of step (a) includes about one part soy protein isolate with about 4 parts water; and
    the powdered food ingredient added in step (b) is soy protein concentrate in an amount from about 0.25 parts to 0.75 parts SPC soy protein concentrate and carrageenan in an amount from about 0.02 to 0.10 parts or about 0.25% of the total formulation weight.

11. The process of claim 1 wherein step (b) includes an addition of a starch product to form a whiter crumble fat mimic.

12. The process of claim 1 wherein ingredients in the blend of step (a) includes about one part soy protein isolate and about 4 parts water; and
    the powdered food ingredient added in step (b) is soy protein concentrate in an amount from about 0.25 parts to 0.75 parts and a starch product in an amount from about 0.05 parts to 0.20 parts of the total formulation weight, the starch/starch products being taken from a group consisting of native corn, modified corn, potato, tapioca, waxy maize, wheat, β-glucan mixtures, xanthan and mixtures thereof.

13. The process of claim 12 wherein the ingredients in step (b) include about 0.4 to 0.6 parts soy protein concentrate.

14. The process of claim 12 wherein the starch product is in an amount of about 0.1 part of the total formulation weight.

15. The process of claim 1 wherein ingredients in the blend of step (a) include about one part soy protein isolate with about 4 parts water; and the powdered food ingredient added in step (b) is soy protein concentrate in an amount from about 0.25 parts to 0.75 parts and gelatin in an amount from about 0.05 parts to 0.2 parts of the total formulation weight.

16. The process of claim 15 wherein the ingredients in step (b) include about 0.4 to 0.6 parts soy protein concentrate.

17. The process of claim 15 wherein said gelatin is about 0.1 parts of the total formulation weight.

18. The process of claim 1 wherein ingredients in the blend of step (a) include about one part isolated soy protein with about 4 parts water; and the powdered food ingredient added in step (b) is soy protein concentrate in an amount from about 0.25 parts to 0.75 parts and a mixture of pectin and CaCO3 in a ratio of about 3:1, said mixture being an amount from about 0.065 parts to 0.26 parts of the total formulation weight.

19. The process of claim 18 wherein the soy protein concentrate of step (b) is about 0.4–0.6 parts of the total formulation weight.

20. The process of claim 19 wherein the mixture is about 0.13 parts of the total formulation weight.

21. The process of claim 1 wherein ingredients in the blend of step (a) include about one part soy protein isolate with about 4 parts water; and the powdered food ingredient added in step (b) is soy protein concentrate in an amount from about 0.25 parts to 0.75 parts and sodium caseinate in an amount from about 0.10 parts to 0.30 parts of the total formulation weight.

22. The process of claim 21 wherein the soy protein concentrate of step (b) is about 0.4 to 0.6 parts soy protein concentrate of the total formulation weight.

23. The process of claim 21 wherein the sodium caseinate is in the amount of about 0.1 parts of the total formulation weight.

24. The process of claim 1 wherein ingredients in the blend of step (a) include about one part soy protein isolate with about 4 parts water; and the powdered food ingredient added in step (b) is soy protein concentrate in an amount from about 0.25 parts to 0.75 parts wheat gluten in an amount from about 0.25 parts to 0.75 parts.

25. The process of claim 24 wherein the soy protein concentrate is about 0.4 to 0.6 parts soy protein concentrate.

26. The process of claim 24 wherein the wheat gluten is about 0.25 parts of the total formulation weight.

27. The process of claim 1 wherein ingredients in step (a) include 1 part soy protein isolate and 4 parts water at room temperature, said ingredients being chopped and then refrigerated for a period of about twelve to thirty-six hours.

28. The process of claim 1 wherein step (a) includes chopping said blend to a gel and after step (a) refrigerating the gel at a temperature of about 2°–5° C. for a period from about 2 to 36 hours and then proceeding to step (b) in said process.

29. The process of claim 1 wherein said powdered food ingredient of step (b) is taken from a group of animal proteins consisting of gelatin, egg albumin, beef blood plasma, sodium caseinate and other milk proteins.

30. A process for making a low fat protein crumble comprising the steps of:

(a) combining a protein taken from a group consisting of isolated soy protein, soy protein concentrate, gelatin, egg albumin, beef blood plasma, deheated mustard flour, sodium caseinate, and wheat gluten; a gum/hydrocolloid taken from a group consisting of guar gum, xanthan, locust bean gum, pectin/CaCO$_3$, carrageenan low gel Iota, carrageenan medium gel Iota-type blend, and carrageenan high gel Kappa; and a starch/starch product taken from a group consisting of tapioca starch, native potato starch, wheat starch, high amylose corn, hydrolyzed oat, hydrolyzed corn flour containing β-glucan, instant corn, waxy maize, corn starch, instant pregelatinized potato starch, and tapioca;

(b) chopping the combination of step (a);

(c) chilling the chopped combination of step (b) at a temperature of about 2° C. for a period in the order of 12–16 hours; and (d) grinding the chilled combination of step (c) to produce crumbles of approximately 3/16-inch.

31. The process of claim 30 wherein water is added to said material of step (a) and chopped to hydrate said material and to produce a gel.

* * * * *